United States Patent [19]
Garber et al.

[11] Patent Number: 5,676,440
[45] Date of Patent: Oct. 14, 1997

[54] UNDER-THE-CABINET APPLIANCE HAVING A UNITARY MOUNTING BRACKET AND METHOD FOR ASSEMBLING THE SAME

[75] Inventors: Alan M. Garber, Richmond, Va.; William K. Lee, Kowloon, Hong Kong

[73] Assignee: Hamilton Beach/Proctor-Silex, Inc., Glen Allen, Va.

[21] Appl. No.: 446,521

[22] Filed: May 22, 1995

[51] Int. Cl.[6] .................................................. A47F 5/08
[52] U.S. Cl. ................ 312/245; 248/220.22; 312/351.12
[58] Field of Search ................................ 312/245, 246, 312/242, 351.14, 351.12; 248/220.22, 220.1, 220.41, 223.41

[56] References Cited

U.S. PATENT DOCUMENTS

| | | | |
|---|---|---|---|
| 2,771,263 | 11/1956 | Boho | 248/298 |
| 3,443,851 | 5/1969 | Earl | 312/245 |
| 3,822,049 | 7/1974 | Saunders | 248/203 |
| 4,313,043 | 1/1982 | White et al. | 312/242 X |
| 4,540,146 | 9/1985 | Basile | 248/201 |
| 4,561,182 | 12/1985 | Yamamoto et al. | 30/433 |
| 4,580,853 | 4/1986 | Hitzeroth et al. | 312/245 |
| 4,653,818 | 3/1987 | DeBruyn | 312/246 |
| 4,666,113 | 5/1987 | Itoh et al. | 312/245 X |
| 4,979,308 | 12/1990 | Moore | 30/400 |
| 5,131,620 | 7/1992 | Roundy | 248/674 |
| 5,190,153 | 3/1993 | Schultz et al. | 206/309 |
| 5,388,793 | 2/1995 | Kosten et al. | 248/201 |
| 5,452,874 | 9/1995 | Kozloff et al. | 248/222.11 |

OTHER PUBLICATIONS

Photocopy showing front and side panels of carton for Proctor-Silex C4434 can opener publicly displayed and/or offered for sale by the appliant's assignee within one year prior to May 22, 1995.
18 Photograph Prepared for Purposes of This Information Disclosure Statement Showing a Presto "Above All" Can Opener.
Catalog Front & Rear Cover and pp. 198–199, Published By Best Products Co., Inc., 1990, Showing Several Prior Art Under the Counter Appliances.
1993/94 Product Catalog, front and rear cover and p. 26, published by Hamilton Beach/Proctor–Silex, Inc., showing Model No. C4434 under–the–cabinet can opener.
Use and Care Manual for Black & Decker Model ECL80 can opener, published by Black & Decker, Inc., 1985.
1992 New Products Catalog, front and rear cover and p. 4, published by Hamilton Beach/Proctor–Silex, Inc., 1992, showing an under–the–cabinet coffee maker.
Copy of instruction manual pacneged with Presto "Above All" can opener.
Product Catalog, front and rear covers and p. 6, published by Hamilton Beach/Procter–Silex, Inc., admitted to be prior art, showing Model No. 76400 under–the–cabinet can opener.
See accompanying Information Disclosure Statement regarding prior public display and sale of can openers by applicant's assignee.

Primary Examiner—Peter M. Cuomo
Assistant Examiner—Stephen Vu
Attorney, Agent, or Firm—Roger S. Dybvig; John J. Cheek

[57] ABSTRACT

An under-the-cabinet appliance includes a housing for operating parts of the appliance having a front wall, a rear wall, and a pair of side walls. Each sidewall has an outwardly-opening groove extending from the front wall toward the rear wall. Each groove also has a forward end opening to the front wall. A mounting bracket has a pair of bracket arms having mutually-confronting support rails that project from the bracket arms. The support rails are configured to be slidably received by the grooves so that the housing may be assembled on the mounting bracket by orienting the housing so that the forward ends of the grooves are aligned with rearward ends of the rails and then moving the housing forwardly relative to the mounting bracket. To facilitate assembly, the rails and grooves are tapered so that they decrease in height from their forward ends to their rearward ends. Additionally, the bracket arms also have outwardly-facing surfaces that are coplanar with outwardly-facing surfaces of the housing when the appliance is assembled on the mounting bracket.

21 Claims, 2 Drawing Sheets

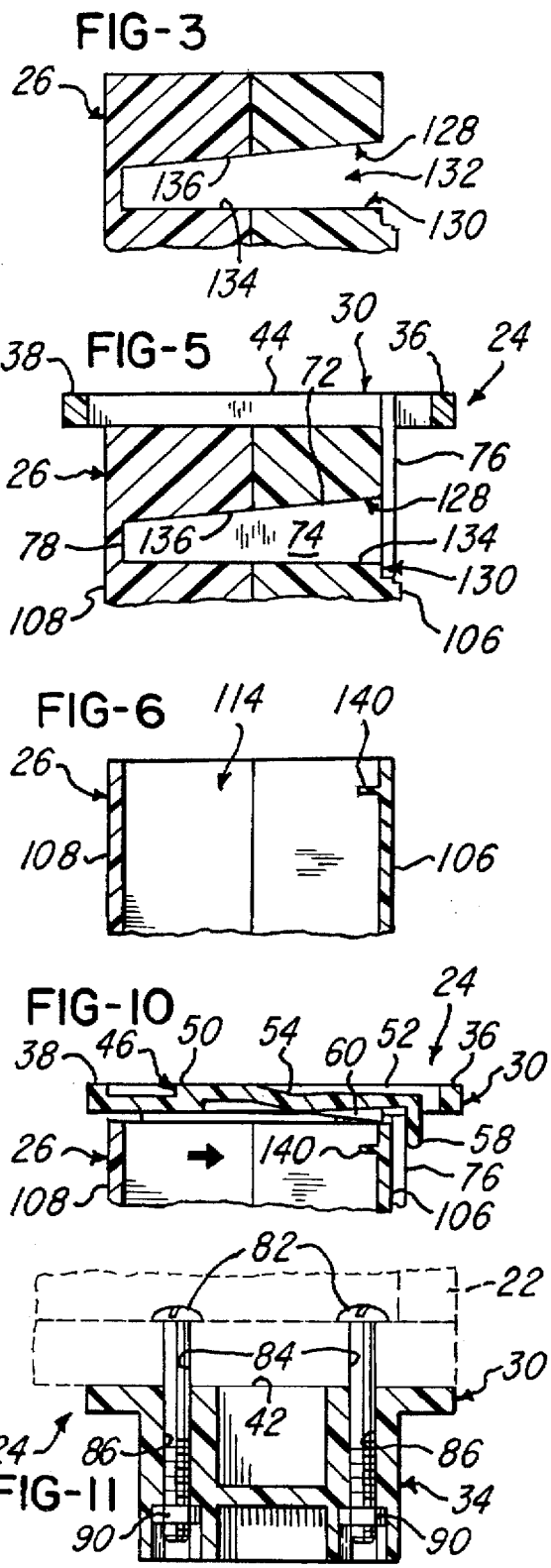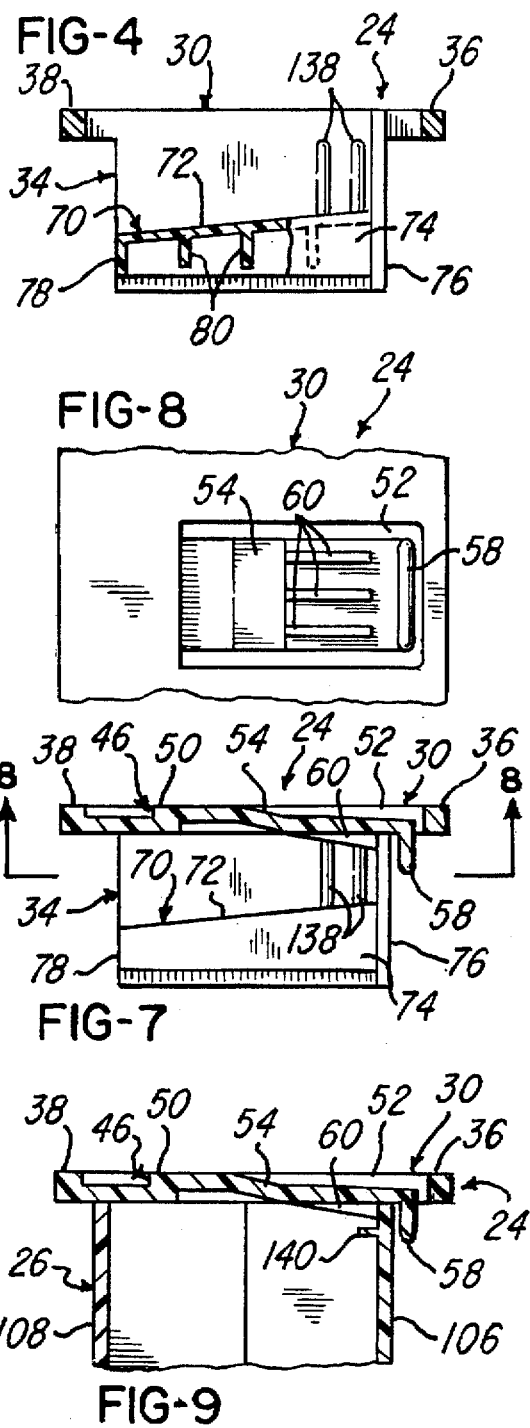

UNDER-THE-CABINET APPLIANCE HAVING A UNITARY MOUNTING BRACKET AND METHOD FOR ASSEMBLING THE SAME

FIELD OF THE INVENTION

This invention relates to an under-the-cabinet appliance which includes a housing for operating parts of the appliance and a mounting bracket therefor. This invention is primarily directed to an under-the-cabinet can opener appliance but may be useful for the other kitchen appliances.

BACKGROUND OF THE INVENTION

To enhance the use of household kitchen counter space, some models of small electrical appliances, such as coffee makers, toaster ovens and can openers, which have traditionally been constructed to rest on kitchen counters, are now mounted above the counters under kitchen cabinets. Previous mounting arrangements have not been entirely satisfactory because they are difficult to mount under a cabinet, or of complicated construction, or presented an unpleasing appearance.

Known under-the-cabinet mounting arrangements are constructed to require that the appliance housing is assembled onto a bracket mounted under a cabinet by aligning the appliance housing with the bracket with the appliance housing held in a generally horizontal position in front of the bracket and moving the appliance housing horizontally toward the front of the bracket and the kitchen wall behind the bracket until the appliance housing is fully engaged with or within the bracket. Many cabinets have a front panel with a downwardly extending lip or overhang that extends below the bottom wall of the cabinet. To accommodate this type of cabinet with the known prior mounting arrangements, the mounting bracket is typically constructed to depend sufficiently below the bottom wall of the cabinet so that the appliance housing is lower than the bottom of the lip, thus undesirably encroaching upon the space above the underlying counter. Some under-the-cabinet mounting arrangements are permanent in the sense that it is impossible to remove the appliance housing without disconnecting the entire assembly from the bottom wall of the cabinet, thus rendering difficult the repair or replacement of the appliance housing.

SUMMARY OF THE INVENTION

An object of this invention is to provide a simple, inexpensive, and rugged under-the-cabinet appliance which includes a housing for operating parts of the appliance and a mounting bracket therefor.

A further object of this invention is to provide an under-the-cabinet appliance in which the appliance housing is assembled on a bracket from the rear of the cabinet, thereby avoiding any interference from cabinet overhangs during mounting.

A still further object of this invention is to provide an under-the-cabinet household appliance having an easily releasable catch for securing the appliance housing to and releasing the appliance housing from a mounting bracket.

An additional object of this invention is to provide an under-the-cabinet appliance comprising an appliance housing and a mounting bracket therefor which, when assembled together, have the appearance of a unitary structure.

In accordance with this invention, an under-the-cabinet appliance includes an appliance housing having a front wall, a rear wall, and a pair of sidewalls. Both housing sidewalls have an outwardly-opening groove extending from the housing front wall toward the housing rear wall, which groove also has a forward end opening to the front wall. The appliance further comprises a mounting bracket which is mounted on the bottom wall of a kitchen cabinet and has a pair of mutually-parallel bracket arms having mutually-confronting support rails that project from the bracket arms. The support rails are configured to be slidably received by the grooves in the appliance housing.

To assemble the appliance on the bottom wall of a cabinet mounted on a kitchen wall, the mounting bracket is connected by screws to the bottom cabinet wall. If the cabinet is mounted on a kitchen wall, the mounting bracket is connected to the bottom wall of the cabinet in spaced relation to the kitchen wall so that the appliance housing can be positioned between the mounting bracket and the kitchen wall in preparation for assembling the appliance housing on the mounting bracket. The appliance housing may then be assembled on the mounting bracket by holding the appliance housing behind the mounting bracket and orienting the appliance housing such that the forward ends of the housing grooves are aligned with the rearward ends of the bracket rails. The appliance housing is then moved by the installer forwardly relative to the mounting bracket so that the housing surfaces defining the grooves are slid onto the mounting bracket rails. To facilitate assembly, the bracket rails and housing grooves are tapered so that they decrease in height from their forward ends to their rearward ends.

Further in accordance with this invention, the appliance housing and the mounting bracket include mutually-cooperating stop surfaces that limit sliding of the appliance housing forwardly relative to the mounting bracket. In addition, the mounting bracket preferably has a manually-releasable spring catch which, when the appliance housing is assembled on the mounting bracket, substantially prevents the appliance housing from being moved rearwardly relative to the mounting bracket. The spring catch can be released by pushing upwardly on a finger-engageable tab conveniently located at the front of the appliance housing to enable removal of the appliance housing from the mounting bracket for repair or replacement.

The appliance housing and the bracket arms are preferably so constructed that, when assembled together, their abutting, outwardly facing surfaces are mutually coplanar so that the appliance has the appearance of a unitary structure.

Other objects and advantages of this invention will become apparent from the following description and the drawings.

BRIEF DESCRIPTION OF THE DRAWINGS

FIG. 3 is a fragmentary, vertical sectional view of the can opener housing, taken along line 3—3 of FIG. 2 at the upper right corner (as viewed in FIGS. 1 and 2) of the housing. Here it may be noted that FIGS. 3 through 11 are on a larger scale than FIGS. 1 and 2.

FIG. 4 is a vertical sectional view of the mounting bracket, taken along line 4—4 of FIG. 2 at the upper right corner of the of the mounting bracket.

FIG. 5 is a fragmentary, vertical sectional view taken along line 5—5 of FIG. 1, showing the portions of the can opener housing and the mounting bracket illustrated, respectively, in FIGS. 3 and 4 assembled together.

FIG. 6 is a fragmentary, vertical sectional view of another portion of the can opener housing taken along line 6—6 of FIG. 2 at the upper middle of the can opener housing.

FIG. 7 is a vertical sectional view of the mounting bracket taken along line 7—7 of FIG. 2 at the middle of the mounting bracket.

FIG. 8 is a fragmentary, bottom plan view of a portion of the middle of the mounting bracket indicated by arrows 8—8 of FIG. 7.

FIG. 9 is a fragmentary, vertical sectional view taken along line 9—9 of FIG. 1 showing the portions of the can opener housing and the mounting bracket illustrated, respectively, in FIGS. 6 and 7 assembled together.

FIG. 10 is fragmentary, vertical sectional view similar to FIG. 9 but at a point in time in which the can opener housing is only partially mounted on the mounting bracket.

FIG. 11 is a vertical sectional view, taken along lines 11—11 of FIG. 1, of the mounting bracket and the mounting bolts and nuts by which the mounting bracket is suspended from the bottom wall of the kitchen cabinet. FIG. 11 also shows a fragment of the kitchen cabinet by phantom lines.

DETAILED DESCRIPTION

Figure 1:
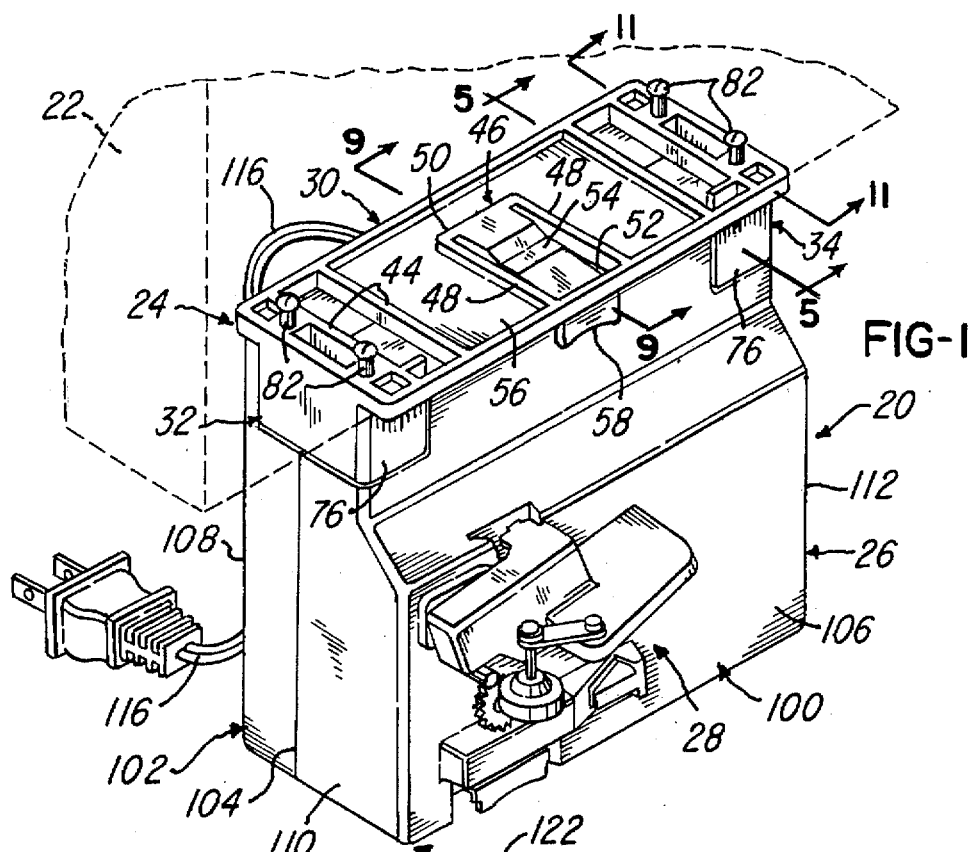
FIG. 1 is a front, top and left side perspective view of an under-the-cabinet appliance, comprising a can opener housing and a mounting bracket for the housing, in accordance with this invention, shown mounted on a kitchen cabinet, a fragment of which is illustrated by phantom lines.
Figure 2:
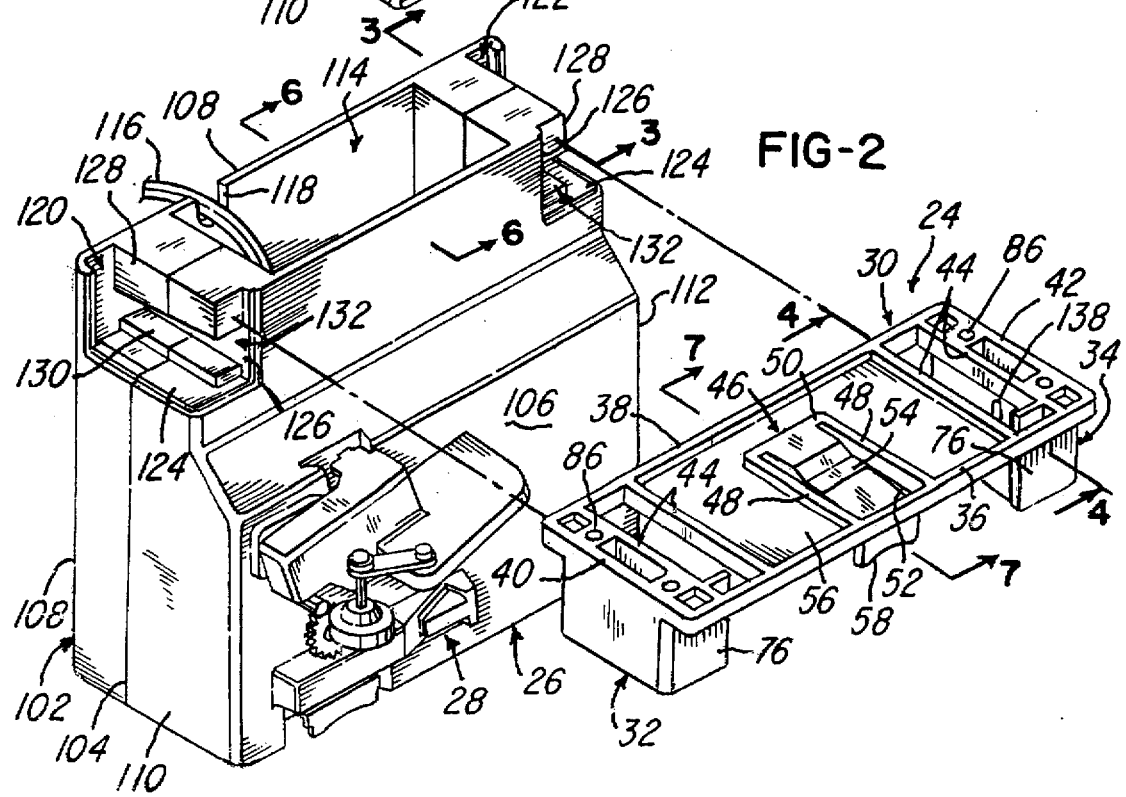
FIG. 2 is a partially exploded perspective view of the appliance of FIG. 1.

Referring to FIGS. 1 and 2, an under-the-cabinet household kitchen can opener, generally designated 20, is shown in FIG. 1 mounted to the underneath side of a kitchen cabinet 22. Can opener 20 includes a mounting bracket, generally designated 24, and a can opener housing, generally designated 26, suspended from the mounting bracket 24. The operating parts of the can opener, generally designated 28, are mounted in and on the housing 26.

With continued reference to FIGS. 1 and 2, the mounting bracket 24 is preferably molded in one-piece from a plastic material, such as ABS, which is presently preferred, polypropylene or polystyrene, or other suitable material. The bracket 24 comprises a rectangular mounting plate, generally designated 30, from which depends a pair of vertical support posts, namely a left side support post, generally designated 32, and a right side support post, generally designated 34. Mounting plate 30 includes a rectangular framework comprising mutually parallel, elongate, front and rear ribs or frame members 36 and 38, a left side rib or frame member 40, a right side rib or frame member 42, and four intermediate ribs intermediate 44 that are parallel to the side frame members 40 and 42 and span between the front and rear ribs 36 and 38.

With reference also to FIGS. 7 and 8, centrally located at the front of the mounting plate 30 is a U-shaped catch arm-support frame, generally designated 46, that comprises a pair of mutually parallel ribs 48 extending perpendicularly from the center of the front frame member 36 that have inner ends interconnected by a catch arm-mounting rib 50 that is parallel to the front and rear frame members 36 and 38. The catch arm-support frame 46 cooperates with the rear face of the front frame member 36 to form an opening or window 52 in which is located a catch arm 54 having a rear edge integrally joined to the forwardly-facing surface of the catch-arm support rib 50.

All of the frame members and/or ribs described above have mutually coplanar upper surfaces and mutually coplanar lower surfaces. Also coplanar with the lower surfaces of the frame members and/or ribs is the bottom surface of a thin-walled, flat sheet 56 that spans the entire area around the catch-arm support frame 46 bounded by the front and rear frame members 36 and 38 and the two innermost intermediate ribs 44.

With reference to FIG. 7, the catch arm 54 comprises an elongate rectangular plate or strap having a thickness which is less than the height of the catch arm-support rib 50 and joins the catch arm-support rib 50 along the upper portion thereof. The catch arm 54 slopes downwardly in steps from rear to front so that its forward end, which is spaced rearwardly from the front frame member 36, is lower than the plane of the upper surfaces of the frame members and/or ribs. Depending from the forward end of the catch arm 54 is a transversely extending, finger-engageable tab 58 which has a smoothly contoured, concave lower surface. The bottom surface of the catch arm 54 has a depending ramp or cam formed from three wedge-shaped projections 60 that terminate at their forward ends in straight edges that are perpendicular to the bottom surface of the front end of the catch arm 54 and parallel to the rear surface of the finger-engageable tab 58. Because only the rear end of the catch arm 54 is fixed to the catch arm-mounting frame 46 and made from a thin-walled plastic material, it is somewhat resilient and tends to be self-biased into its orientation shown in FIGS. 2 and 7, which is the orientation in which it is molded at the time the entire mounting bracket 24 is molded. This property of the catch arm 54 renders it useful as a spring catch as will be described below.

With reference to FIGS. 2 and 4, the right side support post 34 has outer and inner sides spanned by front and rear walls and joined to and coplanar with, respectively, the right side frame member 42 and the intermediate frame or rib 44 nearest the right side frame member 42. A hollow, right side housing support rail or tongue, generally designated 70, joins to and projects inwardly from the support post 34. Support rail or tongue 70 comprises a top wall 72 that slopes upwardly from rear-to-front and an inner side wall 74 which is parallel to the inner wall of the support post 34. The upper surface of the rail side wall 74 slopes to conform to the slope of the top wall 72. A face plate 76 and a rear wall 78 span between the respective ends of the side wall 74 and the confronting face of the inner wall of the support post 34. The face plate 76 is an integral extension of the front wall of the support post 30 and, for reasons which will become apparent, extends inwardly, upwardly, and downwardly beyond the margins of the support rail 70. Plural braces 80, shown only in FIG. 4, add strength and rigidity to the support rail or tongue 70.

The mounting bracket 24 is symmetrical about a vertical plane passing perpendicularly through the horizontal centers of the front and rear frame members 36 and 38 and through the center one of the wedge-shaped projections 60. Accordingly, the left side mounting post 32 and the left side support rail or tongue, which is also designated 70, are constructed identically but in mirror image-relationship, to the right side mounting post 34 and its support rail or tongue 70.

With reference to FIGS. 1 and 11, the right side of the mounting plate 30 is secured to the underneath side of the cabinet 22 by four bolts 82 which extend through holes 84 in the bottom wall of the cabinet 22 and through bores 86 in the mounting plate 30 and the support posts 32 and 34. Hexagonally-shaped recesses 88 at the bottom of the support posts 32 and 34 are provided for receiving nuts 90 which are threaded onto the bolts 82. As is evident, when nuts 90 are threaded onto the bolts 82, the mounting bracket 24 is securely mounted to the underneath side of cabinet 22.

Referring to FIGS. 1 and 2, the can opener housing 26 is preferably formed generally as a hollow, rectangular parallelepiped from a front housing part 100 and a rear housing part 102 which have respective, mutually-confronting top, bottom, and sidewall edges joined together along a vertical joinder line 104 in conventional fashion to form a unitary, box-like structure having a front wall 106, a rear wall 108, a left side sidewall 110 and a right side sidewall 112. The housing parts 100 and 102 are preferably molded from the same plastic material from which the mounting bracket 24 is molded. Some of the operating can opener parts 28, including its drive motor, are housed out-of-view within the can opener housing 26. Because the operating parts 28 may be entirely conventional and form no part of the instant invention, they are not further described herein. Also, it bears repeating that this invention may be applied to kitchen electric appliances other than can openers.

With reference to FIG. 2, the upper center part of the can opener housing 26 has an upwardly open chamber 114 for storing a power cord 116 when the housing 26 is not mounted under a cabinet. A notch 118 is provided in the housing rear wall 108 through which the power cord 116 is extended when the housing 26 is mounted under a cabinet.

With continued reference to FIG. 2, the upper corners of the can opener housing 26 have rectangular recesses, generally designated 120 and 122, which are recessed both from the housing front wall 106 and from the housing sidewalls 110 and 112. Recesses 120 and 122 are defined by bottom walls 124 and inside walls 126 and by a portion of the housing rear wall 108 along with short sections of the housing sidewalls 110 and 112, respectively. Both recesses 120 and 122 are of a size and shape to receive the support posts 32 and 34, respectively, of the mounting bracket 24 so that, when the housing 26 is assembled onto the mounting bracket 24, as shown in FIG. 1, the front walls and the outer sides of the support posts 32 and 34 are coplanar, respectively, with the housing front wall 106 and sidewalls 110 and 112. Because the can opener housing 26 is symmetrical about a vertical plane passing perpendicularly through the horizontal center of thereof, the parts that define the left side recess 120 and the right side recess 122 are constructed identically but in mirror image relationship.

With reference to FIGS. 2, 3 and 5, the inside wall 126 of each of the recesses 120 and 122 has two vertically-spaced bosses 128 and 130 spaced apart that define a longitudinally-extending groove 132 between them of a size and shape to snugly receive the associated one of the support rails or tongues 70 of the mounting bracket 24. Thus, the lower bosses 130 have horizontal upper surfaces 134 while the confronting lower surfaces 136 of the upper bosses 128 slope upwardly from rear to front as best shown in FIG. 3, so that the grooves 132 have the same shape as the support rails or tongues 70.

It will be noted that the housing 26 must be positioned behind the mounting bracket 24 with the grooves 132 at the upper corners of the housing 26 aligned with the support rails or tongues 70. Ordinarily, the need for this alignment will require that the housing 26 will be located between the mounting bracket 24 and the kitchen wall (not shown) on which the cabinet 22 is mounted. During subsequent assembly of the housing 26 onto the mounting bracket 24, the installer simply moves the housing 26 forwardly, i.e. away from the kitchen wall, sliding the grooves 132 over the support rails or tongues 70. A precise vertical alignment between the housing 26 and the mounting bracket 24 at the outset of the assembly procedure is not critical because the larger front ends of the grooves 132 are initially received over the smaller rear ends of the support rails or tongues 70.

As shown in FIGS. 2, 4 and 7, the inside surfaces of the support posts 32 and 34 preferably have thin, vertically extending pressure pads 138 near the forward end thereof which engage the side portions of the upper bosses 128, thereby creating resistance to movement of the housing 26 relative to the mounting bracket 24 during the later stages of the assembly process. Due to the resilient nature of the plastic parts of the mounting bracket 24 and the housing 26, the pressure created by the pressure pads 38 increases the rigidity of the of the assembled appliance 20. The resistance to movement of the housing 26 caused by the pressure is also beneficial if the need arises to remove the housing 26 from the mounting bracket 24, because, when the parts are unlatched, as described below, the housing 24 will not so readily slide relative to the mounting bracket 24 that the person removing the housing 24 will lose control of it.

With reference to FIG. 10, when the housing 26 is almost at the end of its forward movement during assembly onto the mounting bracket 24, the upper surface of the housing front wall 106 engages the lower surface of the ramp formed by the wedge shaped projections 60 on the bottom of the catch arm 54. This causes the front end of the catch arm to be raised upwardly in the window 52. As the housing 26 is subsequently moved to the forward end of its travel to the position shown in FIG. 9, the front ends of the wedge-shaped projections 60, due to the resiliency of the catch arm 54, snap down behind the upper end of the housing front wall 106. Thus, the catch arm 54 cooperates with the housing front wall 106 to create a spring catch assembly by which the front wall 106 is trapped between the finger-engageable tab 58 and the forward ends of the wedge-shaped projections 60, thereby preventing significant rearward movement of the housing 26. To increase the rigidity of the front wall 106, it is preferably provided with an elongate rib 140 (FIGS. 6, 9 and 10) along the entire width of the chamber 114.

As observed earlier, the face plates 76 in front of the support rails or tongues 70 extend inwardly, upwardly and downwardly beyond the tongues 70. In addition, the rear wall 108 of the housing 26 has forwardly-facing upper corners exposed to the front of the housing 26 that engage the outside edges of the rear walls of the support posts 32 and 34. The face plates 76 and the forwardly-facing upper corners of the rear wall 108 thus constitute positive stops that limit the forward movement of the housing 26 relative to the mounting bracket 24. It will also be noted that the face plates 76 fit within the front portions of the recesses 120 and 122 with their front faces coplanar with and merging smoothly with the adjacent front faces of the housing front wall 106. So to, the outwardly facing surfaces of the support posts 32 and 34 are coplanar with and merge smoothly with adjacent surfaces of the housing 26. Accordingly, when the assembly is Completed, the appliance 20 has the appearance of comprising a unitary, one-piece construction.

Should it become necessary to remove the housing 26, such as for repair or replacement, one need only manually engage the finger tab 58 at the front end of the catch arm 54 and push it upwardly so the wedge-shaped projections 60 are above the housing front wall 106 and, while the finger tab 58 is so raised, grasp the housing 26 and push it rearwardly out of engagement with the mounting bracket 24. Because the housing 26 is never located in front of the mounting bracket 24 either during assembly or disassembly, any depending lip or overhang at the front of the cabinet 22 will not interfere with the assembly or disassembly procedures. Because there is no concern with regarding to depending lips or overhangs, the mounting plate 30 can be quite thin so that the housing 26 can be mounted as high above the kitchen counter (not shown) beneath the cabinet 22 as is practicably possible.

Although the presently preferred embodiments of this invention have been described, it will be understood that within purview of this invention various changes may be made within the scope of the following claims.

Having thus described our invention, we claim:

1. An under-the-cabinet appliance, comprising:
   a housing for operating parts of the appliance having a front wall, a rear wall, and a pair of sidewalls, each of said sidewalls having:
     an outwardly-opening groove extending from said front wall toward said rear wall, each of said grooves further having a forward end opening to said front wall, and a substantially planar outwardly-facing side surface;
   a mounting bracket including a pair of bracket arms having mutually-confronting support rails projecting therefrom configured to be slidably received by said grooves, said bracket arms further having outermost side surfaces substantially coplanar with said outwardly-facing side surfaces of said housing when said housing is assembled on said mounting bracket.

2. The appliance claim 1 wherein each of said rails and each of said grooves has forward and rearward ends and wherein each of said rails and each of said grooves tapers in height along a length from a maximum height at said forward end to a minimum height at said rearward end.

3. The appliance of claim 1 wherein said mounting bracket and said housing have mutually-engageable stop surfaces that prevent removal of said housing from said mounting bracket by movement of said housing forwardly relative to said mounting bracket.

4. The appliance of claim 3 wherein each of said bracket arms has a face plate that is substantially coplanar with adjacent front surfaces of said housing when said housing is assembled on said mounting bracket.

5. The appliance of claim 4 wherein the upper corners of the front wall of said housing have forwardly-facing recessed surface portions, and wherein said stop surfaces comprise rearwardly-facing surfaces of said face plates of said bracket arms and said forwardly-facing recessed surface portions of said housing.

6. The appliance of claim 3 wherein said rear wall of said housing has forwardly-facing upper corners exposed to the front of said housing, and wherein said stop surfaces comprise said forwardly-facing upper corners and rearwardly-facing surfaces of said bracket arms.

7. The appliance of claim 1 wherein said housing has an upper surface and a cavity opening to said upper surface, said cavity being bounded in part by said front wall, and wherein said mounting bracket further comprises a spring catch having a forwardly-facing surface located within said cavity and in confronting alignment with a rearwardly-facing surface of said front wall when said housing is assembled on said mounting bracket, said forwardly-facing surface preventing removal of said housing from said mounting bracket by rearward movement of said housing relative to said mounting bracket.

8. The appliance of claim 7 wherein said spring catch has a finger-engageable tab at the forward end thereof extending in front of said housing when said housing is assembled on said mounting bracket, which tab may be manually pushed upwardly to move said forwardly-facing surface out of confronting alignment with said front wall of said housing so that said housing may be removed from said mounting bracket.

9. The appliance of claim 8 wherein said mounting bracket comprises a mounting plate having a front margin, a rear margin and side margins extending between said front margin and said rear margin, wherein said bracket arms depend, respectively, from opposite ones of said side margins of said mounting plate, and wherein said spring catch comprises an elongate, tongue having a rearward end connected to said mounting plate intermediate said side margins.

10. The appliance of claim 9 wherein said tongue has a downwardly-extending ramp having tapered surface portions engaged by said front wall of said housing during assembly so that the forward end of said tongue is cammed upwardly during assembly of said housing on said mounting bracket.

11. The appliance of claim 10 wherein said ramp has forwardly-facing surface portions spaced from said finger tab, said forwardly-facing surfaces of said bracket that prevent rearward movement of said housing relative to said mounting bracket comprising said forwardly-facing surface portions of said ramp.

12. The appliance of claim 11 wherein said ramp is formed by plural wedge shaped projections depending from the bottom of said tongue.

13. The appliance of claim 10 wherein said mounting plate has a window extending therethrough intermediate said side margins thereof, said window being bounded by a rear wall, a front wall and opposed side walls, said tongue having a rearward end located within said window and connected to said window rear wall, said tongue extending forwardly toward said window front wall and said tongue having a normal orientation in which said forward end is below said rearward end and having a self-bias resisting upward movement of said forward end of said tongue, substantially the entire forward end of said tongue being located in said window when said finger-engageable tab is pushed upwardly.

14. An appliance adapted to be mounted to the underside of a cabinet at a location thereon spaced from a structural wall which extends generally vertically behind the cabinet and supports the cabinet, comprising:
   a housing for operating parts of the appliance having a front wall, a rear wall opposite said front wall and confronting the structural wall supporting the cabinet when said appliance is mounted to the underside of the cabinet, and a pair of side walls extending between said front wall and said rear wall, each of said side walls having an outwardly-opening groove extending from said front wall toward said rear wall, each of said grooves also having a forward end opening to said front wall; and
   a mounting bracket adapted to be secured to the cabinet including a pair of bracket arms having mutually-confronting support rails projecting therefrom configured to be slidably received by said grooves so that said housing may be assembled on said mounting bracket by orienting the housing between the mounting bracket and the structural wall supporting the cabinet with the forward ends of said grooves confrontingly aligned with rearward ends of said rails and then moving said housing away from said structural wall and forwardly relative to said mounting bracket.

15. The appliance of claim 14 wherein each of said rails and each of said grooves has forward and rearward ends and wherein each of said rails and each of said grooves, tapers in height along a length from, a maximum height at said forward end to a minimum height at said rearward end.

16. An under-the-cabinet appliance, comprising:
   a housing for operating parts of the appliance having a front wall, a rear wall, and a pair of side walls, each of said side walls having an outwardly-opening groove extending from said front wall toward said rear wall, each of said grooves also having a forward end opening to said front wall, said housing having an upper surface and a cavity opening to said upper surface, said cavity being bounded in part by said front wall; and a mounting bracket including a pair of bracket arms having mutually-confronting support rails projecting therefrom configured to be slidably received by said grooves so that said housing may be assembled on said mounting bracket by orienting the housing so that the forward ends of said grooves are aligned with rearward ends of said rails and then moving said housing forwardly relative to said mounting bracket, said mounting bracket further comprising a spring stop having a forwardly-facing surface portion located within said cavity and in confronting alignment with a rearwardly-facing surface of said front wall when said housing is assembled on said mounting bracket, said forwardly-facing surface portion preventing removal of said housing from said mounting bracket by rearward movement of said housing relative to said mounting bracket.

17. The appliance of claim 16 wherein said spring stop has a finger-engageable tab at a forward end thereof extending in front of said housing when said housing is assembled on said mounting bracket, which tab may be manually pushed upwardly to move said forwardly-facing surface portion out of confronting alignment with said front wall of said housing so that said housing may be removed from said mounting bracket.

18. The appliance of claim 17 wherein said mounting bracket comprises a mounting plate having a front margin, a rear margin and side margins extending between said front margin and said rear margin, wherein said bracket arms depend, respectively, from opposite side margins of said mounting plate, and wherein said spring stop has a rearward end connected to said mounting plate intermediate said side margins.

19. The appliance of claim 18 wherein said spring stop has a downwardly-facing tapered surface engaged by said front wall of said housing during assembly that cams the forward end of said spring clip upwardly during assembly of said housing on said mounting bracket.

20. A method for mounting an appliance to the underside of a cabinet at a location thereon spaced from a structural wall which extends generally vertically behind the cabinet and supports the cabinet, said appliance having (i) a housing for operating parts of the appliance having a front wall, a rear wall opposite the front wall and confronting the structural wall supporting the cabinet when the appliance is mounted to the underside of the cabinet, and a pair of sidewalls extending between said front wall and said rear wall, each of said side walls having an outwardly-opening groove therein extending from said front wall toward said rear wall, each of said grooves also having a forward end opening to said front wall, and (ii) a mounting bracket including a pair of bracket arms having mutually-confronting support rails projecting therefrom each configured to be slidably received by a corresponding one of said grooves in said housing, said method comprising:

securing said mounting bracket to the underside of the cabinet;

orienting said housing so that it is located between said mounting bracket and the structural wall supporting the cabinet with the forward end of each of said grooves confrontingly aligned with a rearward end of the corresponding support rail of said bracket arm; and moving said housing away from the structural wall supporting the cabinet and forwardly relative to said mounting bracket until each of said grooves slidably receives the corresponding support rail of said bracket arm.

21. The appliance of claim 14 wherein controls for the operating parts of the appliance are carried on the front wall of said housing.

* * * * *